United States Patent [19]
Greenberg et al.

[11] Patent Number: 5,980,955
[45] Date of Patent: Nov. 9, 1999

[54] COATED CHEWING GUM PRODUCT AND METHOD OF MAKING

[75] Inventors: Michael J. Greenberg, Northbrook; David G. Barkalow, Deerfield, both of Ill.; Hubert Keck, Freiburg-Munzingen, Germany

[73] Assignee: Wm. Wrigley Jr. Company, Chicago, Ill.

[21] Appl. No.: 08/775,088

[22] Filed: Dec. 30, 1996

[51] Int. Cl.⁶ .................................................. A23G 3/30
[52] U.S. Cl. ...................................... 426/5; 426/3
[58] Field of Search .......................... 426/3, 5, 6

[56] References Cited

U.S. PATENT DOCUMENTS

| | | | |
|---|---|---|---|
| 4,671,967 | 6/1987 | Patel et al. | 426/3 |
| 4,786,511 | 11/1988 | Huzinec et al. | 426/5 |
| 4,867,989 | 9/1989 | Silva et al. | 426/5 |
| 5,376,389 | 12/1994 | Reed et al. | 426/5 |
| 5,536,511 | 7/1996 | Yatka | 426/5 |
| 5,716,652 | 2/1998 | Barkalow et al. | 426/5 |

*Primary Examiner*—Arthur L. Corbin
*Attorney, Agent, or Firm*—Steven P. Shurtz; Brinks, Hofer, Gilson & Lione

[57] ABSTRACT

A coated comestible product having an improved coating appearance and a method for improving the appearance of a coated product is achieved when a food-acceptable, poorly water-soluble salt is added to a coating syrup that further comprises a primary coating material. One preferred inventive coating comprises calcium gluconate as the poorly water-soluble salt, and xylitol as the primary coating material.

48 Claims, No Drawings

COATED CHEWING GUM PRODUCT AND METHOD OF MAKING

BACKGROUND OF THE INVENTION

Comestible products such as chewing gums, other confections, and pharmaceuticals are often covered with a hard or soft coating to vary the taste, appearance, mouth-feel and nutritional value of these products. Traditionally, the primary coating material used to coat these products is sugar. However, to suit the market's demand for sugarless products, it is also necessary to produce sugarless coatings.

One problem that is common to all coatings becomes especially troublesome for sugarless, particularly xylitol, coatings. The surface of the coating are often marred by visible imperfections that appear as dimples, pimples, pits, etc. Although it has been possible to improve the coating appearance, prior efforts often required costly formulation and/or processing changes. It would be desirable to produce a coating that has an improved appearance without the costly formulation and/or processing changes.

SUMMARY OF THE INVENTION

The inventors have found that adding a small quantity of a food-acceptable, poorly water-soluble salt to a coating syrup improves the smoothness of the finished coating. One embodiment provides a coating comprising a poorly water-soluble salt and a coating material. A preferred embodiment provides a coating comprising about 1.5–5% calcium gluconate in xylitol syrup.

DETAILED DESCRIPTION OF THE INVENTION

In the context of this invention, chewing gum refers to chewing gum, bubble gum and the like. Further, although some terms are referred to in the singular, it is understood that such references may also encompass the plural. For example, although coating is referred to in the singular, it is understood that coated products normally comprise multiple layers of coating. Moreover, all percentages are based on weight percentages, and coating and syrup percentages are based on the weight of dry solids, unless otherwise specified. Finally, all references cited herein are incorporated by reference.

The invention contemplates the use of a small quantity of at least one poorly water-soluble salt in coating syrups to improve the appearance of coated products. Such products include chewing gums, other confections and pharmaceuticals. Although the invention is useful for all coating systems which are marred by surface defects in the finished coat, the invention is particularly useful for sugarless coatings such as xylitol coatings.

Sugarless coatings often exhibit defects such as pitting, dimples, pimples and uneven surface. These surface defects appear to be inherent to xylitol coatings. Although good coating appearance have been achieved in the past, prior efforts required a trade-off between good coating appearance and process efficiency. For example, the coating process can be slowed down to improve appearance, but this increases the cost of an already expensive coating operation. In the present instance, the addition of a poorly water-soluble salt to the coating syrup provides an improved coating appearance without any costly formulation and/or process changes.

Without being bound by any particular theory, and without limiting the scope of the invention, the inventors provide several theories to explain the role of the poorly water-soluble salt in improving the coat appearance. It is believed that crystallization of the primary coating material depends on timing and concentration. If the crystallization rate is too quick, the resulting surface will be rough. If the crystallization rate is too slow, the corners will be damaged and efficiency is reduced. In one theory, it is believed that, at appropriate levels, the poorly water-soluble salt comes out of solution at the right time to promote a quick crystallization by seeding the syrup. In other words, the small quantity of poorly water-soluble salt in the coating syrup precipitates at the right time and in the right quantity to promote proper crystallization of the primary coating material.

In another theory, it is believed that the poorly water-soluble salt forms an initial co-crystal with the primary coating material. Either the co-crystal forms the improved coating surface or it promotes the crystallization of the primary coating material to form the improved coating surface. In any case, it is believed that the poorly water-soluble salt reduces or eliminates these coating defects by altering the rate of crystallization of the primary coating material. It is also believed that to produce this rate of crystallization without the poorly water-soluble salt would require a higher concentration of primary coating material in the syrup, which would then have a higher viscosity and would therefore fail to smoothly coat the pellet.

When optimizing the practice of the current invention, the specific salt used and its usage level are interdependent. They are also influenced by the identity of the primary coating material, the solids level in the syrup, the presence of other substances in the coating syrup, coating temperatures and conditions and even the scale and design of the coating apparatus. Thus, a certain amount of experimentation is required to properly utilize the present invention in specific applications.

To more quickly optimize the salt level in the coating syrup, one can conduct a dose-level effect study in petri (or crystallizing) dishes. For example, a series of 70% solids syrups are prepared using xylitol and different incremental levels of various poorly water-soluble salts. After the xylitol and the salts are dissolved (heating may be necessary), approximately 5–10 ml of each syrup is placed into a petri dish. After about 1–2 hours at room temperature, the effect of the salt on the xylitol crystallization is compared to that of a pure xylitol syrup.

An effective salt level will cause the xylitol to crystallize faster than the pure xylitol syrup. Then, the samples are evaluated again about 24 hours later. The syrups containing effective salt levels will contain smaller and more numerous xylitol crystals than the pure xylitol syrup. By contrast, excessive levels of salt will produce a solid mass with few or no observable discrete crystals. Once the effective levels are established by this technique, one may need to lower the levels used in panning slightly, because panning produces a more drastic drying condition than that observed in the petri dish.

Typically, the salts used in the present invention are food acceptable salts that have a solubility in cold water (about 10° C.) of about 0.5 to about 9%, preferably about 1 to about 7%, and most preferably about 2 to about 6%. Calcium and sodium salts are preferred. Such salts include calcium gluconate, calcium glycerophosphate, calcium lactate, calcium phosphate, calcium malate, calcium maleate, calcium benzoate, sodium sulfate and combinations thereof. Calcium gluconate is the preferred salt. The salt comprises about 0.5 to about 15% of the coating syrup based on weight of dry solids, preferably about 1 to about 7%, and most preferably about 1.5 to about 5%.

Other components of the coating syrup and their usage level will be chosen based on the requirements of the specific product and other factors important to the formulator. Generally, the other components will be conventional ingredients at conventional levels. The primary coating materials may be sugars such as sucrose, maltose and dextrose, or sugar alcohols such as xylitol, sorbitol, maltitol, mannitol, lactitol, erythritol and hydrogenated isomaltulose, and combinations thereof. The primary coating material comprises about 61 to about 99.5%, and preferably at about 75 to about 98% of the coating syrup dry solids. Xylitol is the preferred primary coating material, due to its favorable sweetness, non-cariogenicity, crunch and cooling characteristics. However, because it is prone to the type of coating appearance defects described above, and because of its high cost, xylitol may be replaced in part or in whole by other coating materials. In particular, mixtures of xylitol and another sugar alcohol may be used as the primary coating material.

Coating syrups will often contain other ingredients such as flavors, physiological cooling agents, artificial sweeteners, dispersing agents, binders, coloring agents and film formers. For example, binders are used to improve the coating process and the durability and appearance of the finished coating. Binding agents may be added either as an initial coating on the chewing gum center or may be added directly into the syrup. Binding agents contemplated by the present invention include gum arabic, gum tahla, alginate, cellulosics, vegetable gums, and the like.

Flavors, colors and high intensity sweeteners typically comprise up to about 4% based on the weight of dry solids of the syrup, preferably about 0.2 to about 2.5%. Flavors include any flavor which is of food acceptable quality commonly known in the art such as essential oils, synthetic flavors or mixtures thereof. Such flavors include, but are not limited to oils derived from plants and fruits such as citrus oils, fruit essences, peppermint oil, spearmint oil, eucalyptus, other mint oils, clove oil, oil of wintergreen, anise and the like.

Artificial flavor components are also contemplated by the present invention. Those of ordinary skill in the art will recognize that natural and artificial flavors may be combined in any sensorially acceptable blend. All such flavors and blends are contemplated by the present invention. The flavor may be added to the coating syrup in an amount such that the coating will contain from about 0.2% to about 1.2% flavor and preferably from about 0.7% to about 1% flavor.

Artificial sweeteners contemplated for use in the coating include, but are not limited to, synthetic sweeteners such as, saccharin, thaumatin, alitame, saccharin salts, aspartame, sucralose and acesulfame-K. The artificial sweetener may be added to the coating syrup in an amount such that the coating will contain from about 0.05% to about 0.3%, and preferably from about 0.1% to about 0.15% artificial sweetener.

Coloring agents are preferably added directly to the syrup in the dye or lake form. Coloring agents contemplated by the present invention include food quality dyes. Titanium dioxide is a presently preferred coloring agent.

Dispersing agents are often added to syrup coatings for the purpose of whitening and tack reduction. Dispersing agents contemplated by the present invention to be employed in the coating syrup include talc or any other anti-stick compound. The dispersing agent may be added to the coating syrup in amounts such that the coating will contain from about 0.1% to about 1%, and preferably from about 0.3% to about 0.6% of the agent.

Film formers preferably added to the syrup include methyl cellulose, gelatins, hydroxypropyl cellulose, ethyl cellulose, hydroxyethyl cellulose, carboxymethyl cellulose and the like and combinations thereof.

Any suitable coating equipment may be used when practicing the invention. Examples of such equipment include traditional coating pans as well as newer, high technology systems such as those produced by Driam of Germany (U.S. affiliate in Spartanburg, S.C.), Dumoulin of France, and Latini.

Process parameters for the coating process will be set by the operator skilled in this technology. Generally, they will be within the normally used ranges. However, it may be desirable in some cases to optimize these parameters to obtain maximum benefit from the present invention. Particularly, adjusting the syrup brix, pause time, spray/dry cycles, air temperature and relative humidity will optimize the coating process. In addition, practices such as dry charging and interruption of drying air may be desirable in some processes.

As noted above, conventional panning procedures generally use sucrose as the coating material, but preferences for non-cariogenic and low-cost products have motivated the use of other carbohydrate materials in the place of sucrose. These components include, but are not limited to, dextrose, maltose, erythritol, xylitol, hydrogenated isomaltulose and other new polyols, and a combination thereof. The combinations may be mixtures, where the combined materials will co-crystallize or the combination may comprise layers of different primary coating materials, as disclosed in U.S. Pat. No. 5,536,511, issued on Jul. 16, 1996 to Yakta.

The coating material may be blended with panning modifiers including, but not limited to, gum arabic, maltodextrins, corn syrup, gelatin, cellulose type materials like carboxymethyl cellulose or hydroxymethyl cellulose, starch and modified starches, vegetable gums like alginates, locust bean gum, guar gum and gum tragacanth, insoluble carbonates like calcium carbonate or magnesium carbonate, and talc. Antitack agents may also be added as panning modifiers, which allow the use of a variety of carbohydrates and sugar alcohols to be used in the development of new panned or coated products.

The chewing gum center in one embodiment of the present invention typically contains a chewable gum base portion which is essentially free of water and is water-insoluble, a water-soluble bulk portion and flavors which are typically water insoluble. The water-soluble portion dissipates with a portion of the flavor over a period of time during chewing. The gum base portion is retained in the mouth throughout the chew.

The insoluble gum base generally comprises elastomers, elastomer solvents, plasticizers, waxes, emulsifiers and inorganic fillers. Plastic polymers, such as polyvinyl acetate, which behave somewhat as plasticizers, are also often included. Other plastic polymers that may be used include polyvinyl laureate, polyvinyl alcohol and polyvinyl pyrrolidone.

Elastomers may include polyisobutylene, butyl rubber, (isobutylene-isoprene copolymer) and styrene butadiene rubber, as well as natural latexes such as chicle. Elastomer solvents are often resins such as terpene resins. Plasticizers, sometimes called softeners, are typically fats and oils, including tallow, hydrogenated and partially hydrogenated vegetable oils, and coca butter. Commonly employed waxes include paraffin, microcrystalline and natural waxes such as beeswax and carnauba. Micro-crystalline waxes, especially those with a high degree of crystallinity, may be considered bodying agents or textural modifiers.

The gum base typically also includes a filler component. The filler component may be calcium carbonate, magnesium carbonate, talc, di-calcium phosphate or the like. The filler may constitute between about 5% and about 60% of the gum base. Preferably, the filler comprises about 5% to about 50% of the gum base.

Emulsifiers, which sometimes also have plasticizing properties, include glycerol monostearate, lecithin and glycerol triacetate. Further, gum bases may also contain optional ingredients such as pharmaceutical agents, antioxidants and colors.

Chewing gum intended for use as centers in coated products typically have higher gum base levels than other formulations. According to a preferred embodiment of the present invention, the insoluble gum base constitutes between about 5% to about 95% of the gum. More preferably the insoluble gum base comprises between about 10% and about 65% of the gum and most preferably from about 20% to about 60% of the gum. The present invention contemplates employing any commercially acceptable gum base.

The water-soluble portion of the chewing gum may further comprise softeners, sweeteners, flavors, physiological cooling agents and combinations thereof. The sweeteners often fulfill the role of bulking agents in the gum. The bulking agents typically comprise about 5% to about 95% of the gum composition.

Softeners are added to the chewing gum in order to optimize the chewability and mouth feel of the gum. Softeners, also known in the art as plasticizers or plasticizing agents, generally constitute between about 0.5% to about 15% of the chewing gum. Softeners contemplated by the present invention include glycerin, lecithin and combinations thereof. Further, aqueous sweetener solutions such as those containing sorbitol, hydrogenated starch hydrolyzate, corn syrup and combinations thereof may be used as softeners and binding agents in gum.

As mentioned above, the coating of the present invention will most commonly be used on sugar-free gum formulations. However, the present invention is also useful for coated sugared gum formulations that are marred by surface defects. Therefore, the sweeteners for the sugared gums may include either sugar or non-sugar sweeteners. Sugar sweeteners generally include saccharide-containing components commonly known in the chewing gum art which comprises, but are not limited to, sucrose, dextrose, maltose, dextrin, dried invert sugar, fructose, levulose, galactose, corn syrup solids and the like, alone or in any combination.

Generally sugarless sweeteners include components with sweetening characteristics but which are devoid of the commonly known sugars and comprise, but are not limited to, sugar alcohols such as sorbitol, mannitol, lactitol, xylitol, erythritol, hydrogenated starch hydrolyzate, maltitol, hydrogenated isomaltulose and the like, alone or in any combination.

Depending on the particular sweetness release profile and shelf-stability needed, coated or uncoated high-intensity sweeteners may be used in the chewing gum center or in the coating. High-intensity sweeteners, preferably aspartame, may be used at levels from about 0.01% to about 3%. Encapsulated aspartame is a high intensity sweetener with improved stability and release characteristics, as compared to free aspartame. Free aspartame can also be added, and a combination of some free and encapsulated aspartame is preferred when aspartame is used.

The flavors contemplated for the gum center are the same as those disclosed for the gum coating. Flavors may be present in the chewing gum in an amount within the range of from about 0.1% to about 10%, preferably from about 0.5% to about 3%, of the gum.

Optional ingredients such as colors, emulsifiers and pharmaceutical agents may also be added as separate components of the chewing gum composition, or added as part of the gum base.

Aqueous syrups, such as corn syrup and hydrogenated corn syrup may be used, particularly if their moisture content is reduced. This can preferably be done by co-evaporating the aqueous syrup with a plasticizer, such as glycerin or propylene glycol, to a moisture content of less than 10%. Preferred compositions include hydrogenated starch hydrolyzates solids and glycerin. Such syrups and their methods of preparation are discussed in detail in U.S. Pat. No. 4,671,967.

A preferred method of manufacturing chewing gum according to the present invention is by sequentially adding the various chewing gum ingredients to any commercially available mixer known in the art. After the ingredients have been thoroughly mixed, the gum is discharged from the mixer and shaped into the desired form such as by rolling into sheets and cutting into sticks, extruding into chunks, or casting or pressing into pellets.

Generally, the ingredients are mixed by first melting the gum base and adding it to the running mixer. The base may also be melted in the mixer itself. Color or emulsifier may also be added at this time. A softener such as glycerin may be added at this time, along with syrup and a portion of the bulking agent. Further portions of the bulking agents may be added to the mixer. Flavor and physiological cooling agents are typically added with the final portion of the bulking agent. Other optional ingredients are added in the batch in a typical fashion well known to those of ordinary skill in the art.

Once formed, the chewing gum center can be coated. The coating is initially present as a liquid syrup which contains from about 30% to about 90% or 95% of the coating ingredients previously described herein, and from about 5% or 10% to about 70% of a solvent such as water. In general, the coating process is carried out in conventional panning equipment. Gum center tablets to be coated are placed into the panning equipment to form a moving mass.

The material or syrup which will eventually form the coating is applied or distributed over the gum center tablets. Flavors may be added before, during and after applying the syrup to the gum centers. Once the coating has dried to form a hard surface, additional syrup additions can be made to produce a plurality of coatings or multiple layers of coating.

In the panning procedure, syrup is added to the gum center tablets at a temperature range of from about 38° C. to about 116° C. Preferably, the syrup temperature is from about 64° C. to about 93° C., and most preferably from about 75° C. to about 90° C. Most preferably, the syrup temperature should be kept constant throughout the process in order to prevent the polyol in the syrup from crystallizing. The syrup may be mixed with, sprayed upon, poured over, or added to the gum center tablets in any way known to those skilled in the art.

In another embodiment, a soft coating is formed by adding, or dry charging, a powder coating after a liquid coating. The powder coating typically comprises sugars or sugar alcohols as described above. Other ingredients may include natural carbohydrate gum hydrolyzates, maltodextrin, gelatin, cellulose derivatives, starches, modified starches, natural carbohydrate gums and fillers like talc and calcium carbonate.

Each component of the coating on the gum center may be applied in a single layer or in a plurality of layers that are the same or different. In general, a plurality of layers is obtained by applying single coats, allowing the layers to dry, and then repeating the process. The amount of solids added by each coating step depends chiefly on the concentration of the coating syrup. Any number of coats may be applied to the gum center tablet. Preferably, no more than about 75 coats are applied to the gum center. More preferably, less than about 60 coats are applied and most preferably, about 30 to about 60 coats are applied. In any event, the present invention contemplates applying an amount of syrup sufficient to yield a coated chewing gum product containing about 10% to about 65% coating. Preferably, the final product will contain from about 20% to about 50% coating. In the context of this invention, coating are defined as hard or soft coating. Coating does not include film coating wherein the coating comprises film coating of the cellulosic type.

Those skilled in the art will recognize that in order to obtain a plurality of coated layers, a plurality of premeasured aliquots of coating syrup may be applied to the gum center. It is contemplated, however, that the volume of aliquots of syrup applied to the gum center may vary throughout the coating procedure.

Once a coating of syrup is applied to the gum center, the present invention contemplates drying the wet syrup in an inert medium. A preferred drying medium comprises air. Preferably, forced drying air contacts the wet syrup coating in a temperature range of from about 20° C. to about 46° C. More preferably, the drying air is in the temperature range of from about 25° C. to about 35° C. The invention also contemplates that the drying air possess a relative humidity of less than about 25 percent. Preferably, the relative humidity of the drying air is less than about 15 percent.

The drying air may be passed over and admixed with the syrup coated gum centers in any way commonly known in the art. Preferably, the drying air is blown over and around the syrup coated gum center at a flow rate, for large scale operations, of about 2800 cubic feet per minute. If lower quantities of material are being processed, or if smaller equipment is used, lower flow rates would be used. It a flavor is applied after a syrup coating has been dried, the present invention contemplates drying the flavor with or without the use of a drying medium.

While details have been provided regarding coating chewing gum pellets, the same or slightly modified procedures and syrups can be used to coat other comestibles. Utilizing the foregoing teachings, such coating operations are within the ordinary skill in the art.

EXAMPLES

Sample 1 (gum centers)

Chewing gum centers were manufactured according to the following formula:

| | |
|---|---|
| Base | 47.61% |
| Sorbitol | 43.14% |
| Glycerin | 7.44% |
| Flavor | 1.68% |
| Encapsulated Aspartame | 0.13% |
| | 100.00% |

The ingredients were mixed and formed into 0.95 g pillow shape centers.

Sample 2 (control syrups)

Control syrups were prepared by dissolving all components, except the titanium dioxide, in water, and heating to a low boil to produce a clear syrup. Then water was added to bring the solution to the specified Brix. The titanium dioxide was then suspended in the syrup.

| | A | B |
|---|---|---|
| Water | 11.5% | 20.3% |
| Xylitol | 68.5% | 71.5% |
| 50% Gum Tahla Solution | 19.4% | 6.4% |
| Titanium Dioxide | 0.6% | 1.8% |
| | 100.0% | 100.0% |
| | Brix = 71 | Brix = 69 |

Sample 3 (control coated pellets)

60 kg of the Sample 1 centers were placed in a DriaCoater 1200 and the coater was run at speeds between 8 rpm–11 rpm. Air temperature was controlled between 26° and 29° C. The syrups were held at 85° C. Syrup was sprayed intermittently with drying periods of 2.5 to 5 minutes between applications. A total of 26.65 kg of control syrup 2A was applied followed by approximately 16 kg of control syrup 2B to bring the pellets to a weight of 1.52 g. During syrup application, 390 g of flavor was added in several portions. Finally, 36.9 g carnuba wax and 51.8 g of talc were added to the coater to polish the pellets.

Example 1 (inventive syrups)

The inventive syrups were prepared exactly as the control syrups above, but with calcium gluconate added, according to the following formulations.

| | A | B |
|---|---|---|
| Water | 11.3% | 20.0% |
| Xylitol | 67.3% | 70.1% |
| Calcium Gluconate | 1.7% | 1.8% |
| 50% Gum Tahla Solution | 19.1% | 6.3% |
| Titanium Dioxide | 0.6% | 1.8% |
| | 100.0% | 100.0% |
| | Brix = 71 | Brix = 69 |

Example 2 (inventive coated pellets)

The parameters as listed above in Sample 3 were duplicated, wherein the inventive syrups 1A and 1B replaced the control syrups 2A and 2B respectively.

RESULTS

One hundred pellets were randomly selected from each of Sample 3 and Example 2, and were submitted to a judge without any indication as to the source of the pellets for appearance scoring. The judge was previously trained to use a five point scale to rate defects in the pellets, higher scores indicate more defects. The pellets of Sample 3 (comparative) had an average score of 2.70, while the pellets of Example 2 (inventive) had an average score of 2.25. The inventive pellets had fewer dimples on the edges. A second batch of 100 pellets of Sample 3 were submitted to the judge and this time the average score was 2.81. The actual break down of ratings were as follows:

| RATING | 1st Sample 3 | 2nd Sample 3 | Example 2 |
|---|---|---|---|
| 1 (perfect) | 0 | 0 | 9 |
| 2 | 30 | 19 | 57 |
| 3 | 70 | 81 | 34 |
| 4 | 0 | 0 | 0 |
| 5 (worst) | 0 | 0 | 0 |
| Average | 2.70 | 2.81 | 2.25 |

Statistical analysis of the data indicated that the inventive Example 2 pellets were superior to the control Sample 3 pellets in appearance at a confidence level of >99%.

The inventors believe that greater appearance improvements could be realized with higher calcium gluconate levels, such as 5%. The pellets from each of Sample 3 and Example 2 passed a sensory descriptive panel for crunch, sweetness, flavor, etc. No difference in crunch, flavor and sweetness was noticed between the pellets from each of Sample 3 and Example 2.

It should be appreciated that the coatings and coated chewing gum of the present invention are capable of being incorporated in the form of a variety of embodiments, only a few of which have been illustrated and described above. The invention may be embodied in other forms without departing from its spirit or essential characteristics. A wide range of changes and modifications to the embodiments of the invention described above will be apparent to persons skilled in the art.

The described embodiments are to be considered in all respects only as illustrative and not restrictive, and the scope of the invention, therefore, is indicated by the appended claims rather than by the foregoing description. All changes which come within the meaning and range of equivalency of the claims are to be embraced within their scope.

We claim:

1. A chewing gum product having a coating made from a syrup comprising:
   a) a primary coating material; and
   b) a poorly water-soluble food acceptable salt having a solubility of between about 0.5 and about 9% in 10° C. water.

2. The product of claim 1 wherein the primary coating material is selected from the group consisting of sucrose, maltose, dextrose, xylitol, sorbitol, maltitol, mannitol, lactitol, erythritol, hydrogenated isomaltulose and combinations thereof.

3. The product of claim 1 wherein the primary coating material comprises xylitol.

4. The product of claim 3 wherein the primary coating material further comprises another sugar alcohol.

5. The product of claim 1 wherein the poorly water-soluble salt comprises a calcium salt.

6. The product of claim 1 wherein the poorly water-soluble salt comprises a sodium salt.

7. The product of claim 1 wherein the poorly water-soluble salt is selected from the group consisting of calcium gluconate, calcium glycerophosphate, calcium lactate, calcium phosphate, calcium malate, calcium maleate, calcium benzoate, sodium sulfate and combinations thereof.

8. The product of claim 1 wherein the poorly water-soluble salt comprises calcium gluconate.

9. The product of claim 1 wherein the salt has a solubility in 10° C. water of between about 1 and about 7%.

10. The product of claim 1 wherein the salt has a solubility in 10° C. water of between about 2 and about 6%.

11. The product of claim 1 wherein the poorly water-soluble salt comprises about 0.5 to 15% of the coating.

12. The product of claim 1 wherein the poorly water-soluble salt comprises about 1 to 7% of the coating.

13. The product of claim 1 wherein the poorly water-soluble salt comprises about 1.5 to 5% of the coating.

14. The product of claim 1 wherein the primary coating material comprises about 61 to 99.5% of the coating.

15. The product of claim 1 wherein the primary coating material comprises about 75 to 98% of the coating.

16. The product of claim 1 wherein the product is a chewing gum.

17. The product of claim 1 wherein the product is a substantially sugarless chewing gum.

18. The product of claim 1 wherein the coating is a soft coating.

19. The product of claim 1 wherein the coating is a hard coating.

20. The coated product of claim 1 wherein the salt is selected from the group consisting of calcium gluconate, calcium glycerophosphate, calcium lactate, calcium phosphate, calcium malate, calcium benzoate, sodium sulfate and combinations thereof.

21. A chewing gum product having a coating made from a coating syrup comprising:
   a) a poorly water-soluble, food acceptable salt having a solubility of between about 0.5 and about 9% in 10° C. water; and
   b) a primary coating material, wherein the coating has an improved appearance compared to a coating made from the same primary coating material but without the poorly water-soluble salt.

22. The product of claim 21 wherein
   a) the poorly water-soluble salt is selected from the group consisting of calcium gluconate, calcium glycerophosphate, calcium lactate, calcium phosphate, calcium malate, calcium maleate, calcium benzoate, sodium sulfate and combinations thereof; and
   b) the primary coating material is selected from the group consisting of sucrose, maltose, dextrose, xylitol, sorbitol, maltitol, mannitol, lactitol, erythritol, hydrogenated isomaltulose and combinations thereof.

23. The product of claim 21 wherein the product is a substantially sugarless chewing gum.

24. The product of claim 23 wherein the salt comprises calcium gluconate, and the primary coating material comprises xylitol.

25. The product of claim 21 wherein the poorly water-soluble salt comprises a calcium salt.

26. The product of claim 21 wherein the poorly water-soluble salt comprises a sodium salt.

27. The product of claim 21 wherein the salt has a solubility in 10° C. water of between about 1 to about 7%.

28. The product of claim 21 wherein the salt has a solubility in 10° C. water of between about 2 to about 6%.

29. The coated product of claim 21 wherein the salt is selected from the group consisting of calcium gluconate, calcium glycerophosphate, calcium lactate, calcium phosphate, calcium malate, calcium benzoate, sodium sulfate and combinations thereof.

30. A method of coating a chewing gum product comprising the steps of:
   a) providing a chewing gum product; and
   b) coating the product with a coating syrup comprising:
      i) a poorly water-soluble, food acceptable salt having a water solubility of between about 0.5 and about 9% in 10° C. water; and
      ii) a primary coating material.

31. The method of claim 30 wherein a) the poorly water-soluble salt is selected from the group consisting of calcium gluconate, calcium glycerophosphate, calcium lactate, calcium phosphate, calcium malate, calcium maleate, calcium benzoate, sodium sulfate and combinations thereof; and b) the primary coating material is selected from the group consisting of sucrose, maltose, dextrose, xylitol, sorbitol, maltitol, mannitol, lactitol, erythritol, hydrogenated isomaltulose and combinations thereof.

32. The method of claim 30 wherein the product is a substantially sugarless chewing gum.

33. The method of claim 32 wherein the salt comprises calcium gluconate, and the primary coating material comprises xylitol.

34. The method of claim 30 wherein the poorly water-soluble salt comprises a calcium salt.

35. The method of claim 30 wherein the poorly water-soluble salt comprises a sodium salt.

36. The method of claim 30 wherein the salt has a solubility in 10° C. water of between about 1 to about 7%.

37. The method of claim 30 wherein the salt has a solubility in 10° C. water of between about 2 to about 6%.

38. The method of claim 30 wherein the salt is selected from the group consisting of calcium gluconate, calcium glycerophosphate, calcium lactate, calcium phosphate, calcium malate, calcium benzoate, sodium sulfate and combinations thereof.

39. A method of improving the appearance of a coated chewing gum product that is made by coating the product with a coating syrup, the improvement comprising the step of including a poorly water-soluble, food acceptable salt in the coating syrup, the salt having a solubility of between about 0.5 and about 9% in 10° C. water.

40. The method of claim 39 wherein a) the poorly water-soluble salt is selected from the group consisting of calcium gluconate, calcium glycerophosphate, calcium lactate, calcium phosphate, calcium malate, calcium maleate, calcium benzoate, sodium sulfate and combinations thereof; and b) the coating syrup further comprises a primary coating material selected from the group consisting of sucrose, maltose, dextrose, xylitol, sorbitol, maltitol, mannitol, lactitol, erythritol, hydrogenated isomaltulose and combinations thereof.

41. The method of claim 39 wherein the product is a substantially sugarless chewing gum.

42. The method of claim 41 wherein the salt comprises calcium gluconate, and the primary coating material comprises xylitol.

43. The method of claim 39 wherein the poorly water-soluble salt comprises a calcium salt.

44. The method of claim 39 wherein the poorly water-soluble salt comprises a sodium salt.

45. The method of claim 39 wherein the salt has a solubility in 10° C. water of between about 1 and about 7%.

46. The method of claim 39 wherein the salt has a solubility in 10° C. water of between about 2 and about 6%.

47. The method of claim 39 wherein the salt is selected from the group consisting of calcium gluconate, calcium glycerophosphate, calcium lactate, calcium phosphate, calcium malate, calcium benzoate, sodium sulfate and combinations thereof.

48. A chewing gum coated product having a coating made from a syrup comprising:

a) a primary coating material; and b) between about 1.5 and about 5%, by weight of the syrup, of a poorly water-soluble, food acceptable salt selected from the group consisting of calcium gluconate, calcium glycerophosphate, calcium lactate, calcium phosphate, calcium malate, calcium benzoate, sodium sulfate and combinations thereof.

* * * * *